(12) United States Patent
Lee (10) Patent No.: US 12,494,576 B2
(45) Date of Patent: Dec. 9, 2025

(54) AIR MOBILITY AND CONTROL METHOD THEREOF

(71) Applicants: Hyundai Motor Company, Seoul (KR); Kia Corporation, Seoul (KR)

(72) Inventor: Sang Heun Lee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 445 days.

(21) Appl. No.: 17/993,419

(22) Filed: Nov. 23, 2022

(65) Prior Publication Data

US 2023/0178889 A1 Jun. 8, 2023

(30) Foreign Application Priority Data

Dec. 6, 2021 (KR) .................. 10-2021-0172872

(51) Int. Cl.
*H01Q 3/34* (2006.01)
*G01S 19/51* (2010.01)
*H01Q 3/30* (2006.01)
*G01S 19/39* (2010.01)
*G01S 19/42* (2010.01)
*G01S 19/47* (2010.01)

(52) U.S. Cl.
CPC .............. *H01Q 3/34* (2013.01); *G01S 19/51* (2013.01); *H01Q 3/30* (2013.01); *G01S 19/393* (2019.08); *G01S 19/42* (2013.01); *G01S 19/47* (2013.01)

(58) Field of Classification Search
CPC ........ G01S 19/47; G01S 19/393; G01S 19/39; G01S 19/42; G01S 19/49; G01S 19/51; H01Q 3/30; H01Q 3/36; H01Q 3/34; H01Q 21/064; H01Q 21/065; H01Q 1/28

USPC .............. 342/357.3, 357.22, 357.25, 357.32, 342/357.34

See application file for complete search history.

(56) References Cited

U.S. PATENT DOCUMENTS

| 7,026,991 | B2* | 4/2006 | Hamada | H04B 7/0617 |
| | | | | 342/442 |
| 7,474,898 | B2* | 1/2009 | Yamazaki | H01Q 1/3275 |
| | | | | 455/456.6 |
| 11,172,334 | B2* | 11/2021 | Herschfelt | H04W 4/029 |
| 11,812,341 | B2* | 11/2023 | Herschfelt | H04W 4/02 |

(Continued)

FOREIGN PATENT DOCUMENTS

| DE | 102018101878 A1 * | 8/2019 | ............... H01Q 3/26 |
| JP | 2012112738 A * | 6/2012 | ............. G01S 19/14 |
| WO | WO-2018191965 A1 * | 10/2018 | ............... G05D 3/12 |

*Primary Examiner* — Chuong P Nguyen
(74) *Attorney, Agent, or Firm* — Morgan Lewis & Bockius LLP (57) ABSTRACT

An air mobility includes a global navigation satellite system (GNSS) receiver, an antenna array, and a controller electrically connected to the GNSS receiver and the antenna array. The controller is configured to identify a first location of the air mobility including an altitude of the air mobility based on an output of the GNSS receiver, identify a first relative direction of facing a communication target with respect to the first location of the air mobility, control the antenna array so that a wireless signal by the antenna array is deflected in the first relative direction, predict a second relative direction of facing the communication target based on a movement of the air mobility, and control the antenna array so that the wireless signal by the antenna array is deflected in the second relative direction.

16 Claims, 8 Drawing Sheets

(56) References Cited

U.S. PATENT DOCUMENTS

| | | | |
|---|---|---|---|
| 11,988,735 B2* | 5/2024 | Srinivas | H04B 7/18506 |
| 2001/0020917 A1* | 9/2001 | Hamada | H04B 7/0617 |
| | | | 342/442 |
| 2014/0105054 A1* | 4/2014 | Sægrov | H04W 64/00 |
| | | | 370/252 |
| 2018/0025651 A1* | 1/2018 | Anderson | G05D 1/0022 |
| | | | 701/2 |
| 2020/0122830 A1* | 4/2020 | Anderson | B60L 50/60 |
| 2020/0159209 A1* | 5/2020 | Montoya-Mejia | G05D 1/0016 |
| 2024/0134375 A1* | 4/2024 | Tang | G05D 1/248 |

\* cited by examiner

AIR MOBILITY AND CONTROL METHOD THEREOF

CROSS-REFERENCE TO RELATED APPLICATION(S)

The present application claims priority to Korean Patent Application No. 10-2021-0172872, filed on Dec. 6, 2021, the entire contents of which is incorporated herein for all purposes by this reference.

BACKGROUND OF THE PRESENT DISCLOSURE

Field of the Present Disclosure

The present disclosure relates to an air mobility and a control method thereof, and more particularly, to an air mobility including an antenna device, and a control method thereof.

Description of Related Art

Recently, the development of a personal air mobility (PAV) is actively progressing. An air mobility, which is movable without a runway because it may take off and land vertically, is a personal transportation means which may move using a transportation network in the sky.

The air mobility needs to communicate with an external device for stable flight. For example, in the case of a navigation function that guides a route to a destination, an air mobility may receive a GNSS signal from a global navigation satellite system (GNSS) satellite to determine its location. The air mobility may communicate with a mobile communication base station and/or other vehicle through a mobile communication service.

The air mobility may be provided with an antenna device for communication with an external device. The antenna device may perform an antenna array in which a plurality of antennae is regularly arranged.

The antenna array may perform beamforming for efficient communication with external devices.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air mobility configured for efficiently communicating with a communication target on the ground, and a control method thereof.

Additional aspects of the present disclosure will be set forth in part in the description which follows, and in part, will be obvious from the description, or may be learned by practice of the present disclosure.

In accordance with an aspect of the present disclosure, an air mobility including a global navigation satellite system (GNSS) receiver, an antenna array, and a controller electrically coupled to the GNSS receiver and the antenna array. The controller may be configured to identify a first location of the air mobility including an altitude of the air mobility based on an output of the GNSS receiver, identify a first relative direction of facing a communication target with respect to the first location of the air mobility, control the antenna array so that a wireless signal emitted by the antenna array is deflected in the first relative direction, predict a second relative direction of facing the communication target based on a movement of the air mobility, and control the antenna array so that the wireless signal emitted by the antenna array is deflected in the second relative direction.

The controller may be configured to store a location of the communication target in advance, and identify the first relative direction based on the stored location of the communication target and a location of the air mobility.

The air mobility may further include an acceleration sensor and an angular velocity sensor. The controller may be configured to identify a moving velocity and a moving direction of the air mobility based on an output of the acceleration sensor and an output of the angular velocity sensor, and predict a second location of the air mobility based on the moving velocity and the moving direction of the air mobility.

The controller may be configured to correct the second location of the air mobility based on an output of the GNSS receiver.

The controller may be configured to receive a location of the communication target from the communication target while controlling the antenna array to emit the wireless signal omni-directionally.

The controller may be configured to identify the first relative direction based on the received location of the communication target and a location of the air mobility.

The air mobility may further include an acceleration sensor and an angular velocity sensor. The controller may be configured to identify a moving velocity and a moving direction of the air mobility based on an output of the acceleration sensor and an output of the angular velocity sensor, and predict a second location of the air mobility based on the moving velocity and the moving direction of the air mobility.

The controller may be configured to identify a moving velocity and a moving direction of the communication target based on communication with the communication target, and predict the location of the communication target based on the moving velocity and the moving direction of the communication target.

The controller may be configured to correct a second location of the air mobility based on an output of the GNSS receiver, and correct the location of the communication target based on the communication with the communication target.

The antenna array may include a plurality of antennae. The controller may be configured to provide wireless signals including different phase delays to the plurality of antennae so that the wireless signals by the antenna array are deflected.

In accordance with another aspect of the present disclosure, a method of controlling an air mobility, which includes a global navigation satellite system (GNSS) receiver and an antenna array, includes identifying a first location of the air mobility including an altitude of the air mobility based on an output of the GNSS receiver, identifying a first relative direction of facing a communication target with respect to the first location of the air mobility, deflecting a wireless signal emitted by the antenna array in the first relative direction, predicting a second relative direction of facing the communication target based on a movement of the air mobility, and deflecting the wireless signal emitted by the antenna array in the second relative direction thereof.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. This specification does not describe all elements of embodiments, and duplicative contents between general contents or embodiments in the technical field of the present disclosure will be omitted. The terms 'member,' 'module,' and 'device' used in the present specification may be embodied as software or hardware, and it is also possible for a plurality of 'members,' 'modules,' and 'devices' to be embodied as one component, or one 'member,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

Furthermore, when it is described that a part "includes" a component, it means that the component may further include other elements, not excluding the other components unless specifically stated otherwise.

Throughout the specification, when a member is referred to as being "on" or "over" another member, this includes not only a case in which a member is in contact with another member but also a case in which another member exists between two members.

The terms 'first,' 'second,' etc. are used to distinguish one component from another component, and the components are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, an operation principle and embodiments of the present disclosure will be described with reference to the accompanying drawings.

Figure 1:
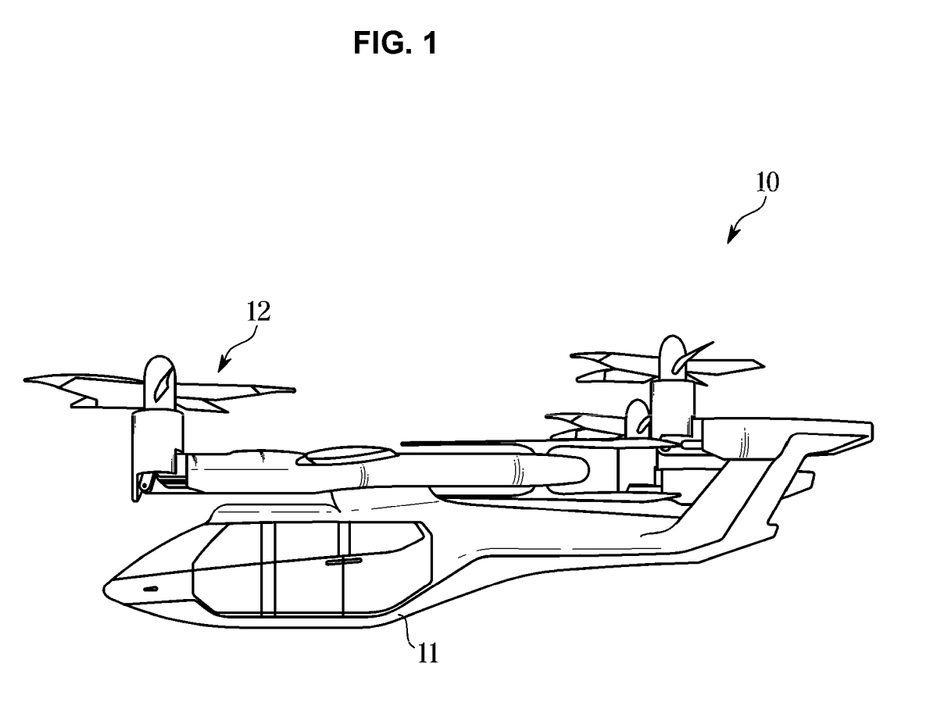
FIG. 1 illustrates a personal air mobility according to an exemplary embodiment of the present disclosure.

FIG. 1 illustrates a personal air mobility according to an exemplary embodiment of the present disclosure.

Referring to FIG. 1, a personal air mobility 10 includes a main body 11 on which a user rides, and a propulsion device 12 for supplying propulsion for flight.

The main body 11 may be provided with a steering device configured for steering the personal air mobility 10 and a display device configured for displaying a state of the personal air mobility 10.

The main body 11 may be provided a cockpit on which a pilot may sit and a passenger seat on which an occupant may sit.

The main body 11 may include an antenna device provided to exchange wireless signals with external devices on the ground to receive information related to flight of the personal air mobility 10. For example, the antenna device may include an antenna array and perform beamforming for efficient communication.

The propulsion device 12, as illustrated in FIG. 1, may be located at an upper end portion of the main body 11, provide propulsion for flight of the personal air mobility 10, and correspond to a propeller that propels the personal air mobility 10 by changing a rotation force of a prime mover into thrust (forward force).

However, the position and type of the propulsion device 12 is not limited to the above example, and is not limited thereto as long as the propulsion device 12 may provide propulsion for flight of the personal air mobility 10. Hereinafter, it will be referred to, as an example, that the propulsion device 12 is located al the upper end portion of the main body and corresponds to a propeller.

Figure 2:
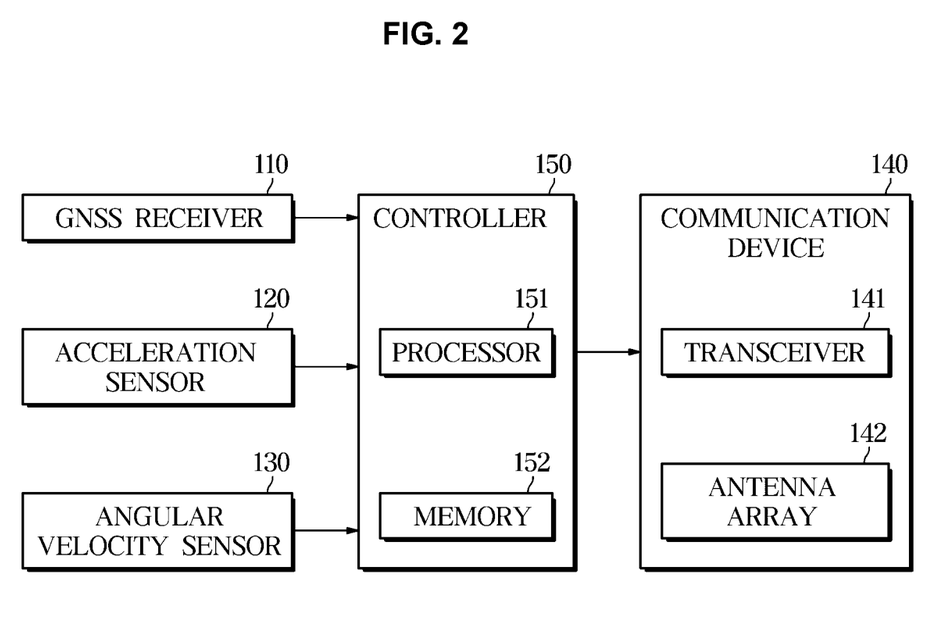
FIG. 2 illustrates a configuration of the personal air mobility according to an exemplary embodiment of the present disclosure.
Figure 3:
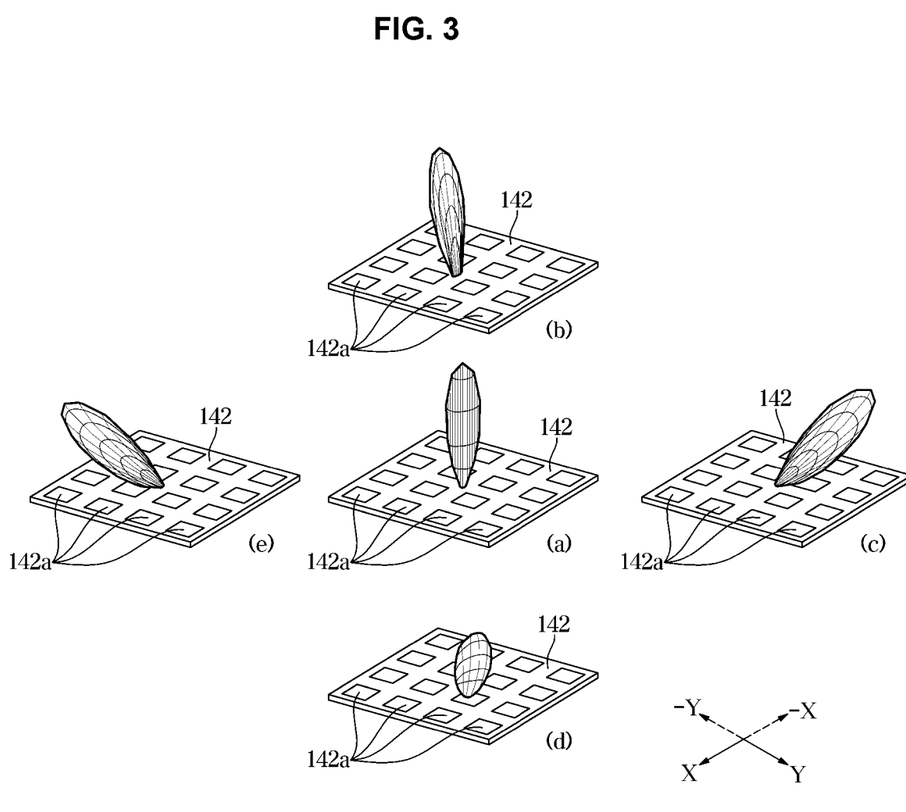
FIG. 3 illustrates examples of beamforming by the personal air mobility according to an exemplary embodiment of the present disclosure.

FIG. 2 illustrates a configuration of the personal air mobility according to an exemplary embodiment of the present disclosure. FIG. 3 illustrates examples of beamforming by the personal air mobility according to an exemplary embodiment of the present disclosure.

Referring to FIG. 2 and FIG. 3, the personal air mobility 10 may include a global navigation satellite system (GNSS)

receiver 110, an acceleration sensor 120, an angular velocity sensor 130, a communication device 140, and a controller 150.

The GNSS receiver 110 may include a GNSS antenna including a dimension for receiving a signal in a frequency band of a GNSS satellite signal (e.g., 1575.42 MHz or 1227.60 MHz, etc.). The GNSS antenna may receive a GNSS signal and provide the received GNSS signal to the GNSS receiver 110.

Based on the reception of the GNSS signal, the GNSS receiver 110 may demodulate the GNSS signal and identify a location of the personal air mobility 10 based on the demodulated signal. The GNSS receiver 110 may provide information related to the location of the personal air mobility 10 to the controller 150.

Herein, the information related to the location of the personal air mobility 10 may include an altitude of the personal air mobility 10 as well as a latitude and longitude of the personal air mobility 10. In other words, the GNSS receiver 110 may obtain information related to a three-dimensional position of the personal air mobility 10 based on the GNSS signal, and provide the information related to the three-dimensional position of the personal air mobility 10 to the controller 150.

The acceleration sensor 120 may measure a linear acceleration, linear velocity, or linear displacement of the personal air mobility 10 while the personal air mobility 10 linearly moves. For example, the acceleration sensor 120 may measure the linear acceleration, linear velocity, or linear displacement of the personal air mobility 10 using Newton's second law of motion (law of acceleration).

The acceleration sensor 120 may include a miniaturized Micro Electro Mechanical System (MEMS) type sensor by fusing micromechanical, microelectronic, and semiconductor process technologies.

The acceleration sensor 120 may provide information related to the linear acceleration, linear velocity, or linear displacement of the personal air mobility 10 to the controller 150.

The angular velocity sensor 130 is referred to as a gyro sensor or a gyroscope, and detects a rotation of the personal air mobility 10. The angular velocity sensor 130 may measure an angular acceleration, angular velocity, and angular displacement of the personal air mobility 10 while the personal air mobility 10 rotationally moves. The angular velocity sensor 130 may measure the angular acceleration, angular velocity, and angular displacement of the personal air mobility 10 using the law of conservation of angular momentum, the Sagnac effect, the Coriolis force, and the like.

The angular velocity sensor 130 may include a MEMS type sensor. For example, a capacitive gyro sensor among MEMS-type gyro sensors may detect deformation of a micromechanical structure due to a Coriolis force proportional to a rotational velocity as a change in capacitance, and determine the rotational velocity from the change in capacitance.

The angular velocity sensor 130 may provide information related to the angular acceleration, angular velocity, and angular displacement of the personal air mobility 10 to the controller 150.

The communication device 140 may include a transceiver 141 and an antenna array 142.

The antenna array 142 may emit wireless signals into free space or receive wireless signals from free space. For example, the antenna array 142 may receive an electrical signal (analog communication signal) for communication from the transceiver 141 and emit a wireless wave corresponding to the analog communication signal into free space using resonance. Furthermore, the antenna array 142 may receive a wireless wave from free space using resonance and provide an electrical signal corresponding to the received wireless wave to the transceiver 141.

The antenna array 142 may include a plurality of regularly disposed antennae 142a. Each of the antennae 142a may be a microstrip antenna, a patch antenna, or a slot antenna.

The antenna array 142 including the plurality of antennae 142a may intensively transmit a wireless signal in a specific direction or selectively receive a wireless signal from a specific direction.

Regarding the transmission of the wireless signal, the antenna array 142 may intensively transmit the wireless signal in a specific direction, depending on a phase of the analog communication signal provided from the transceiver 141 to each of the patch antennae 142a.

As illustrated in FIG. 3, the plurality of antennae 142a may be arranged in a matrix form on an XY plane.

When the analog communication signal of the same phase is supplied to the plurality of antennae 142a, as illustrated in (a) of FIG. 3, the antenna array 142 may transmit radio signals focused in a direction substantially perpendicular to the XY plane.

When the phase of the analog communication signal provided to the antenna located in a positive direction (+X direction) on an X-axis precedes the phase of the analog communication signal provided to the antenna located in a negative direction (−X direction), the wireless signal transmitted from the antenna array 142 may be deflected in a −X-axis direction. Furthermore, when the phase of the analog communication signal provided to the antenna located in the negative direction (−X direction) on the X axis precedes the phase of the analog communication signal provided to the antenna located in the positive direction (+X direction), the wireless signal transmitted from the antenna array 142 may be deflected in a +X-axis direction.

When the phase of the analog communication signal provided to the antenna located in the positive direction (+Y direction) on a Y-axis precedes the phase of the analog communication signal provided to the antenna located in the negative direction (−Y direction), the wireless signal transmitted from the antenna array 142 may be deflected in a −Y-axis direction. Furthermore, when the phase of the analog communication signal provided to the antenna located in the negative direction (−Y direction) on the Y-axis precedes the phase of the analog communication signal provided to the antenna located in the positive direction (+Y direction), the wireless signal transmitted from the antenna array 142 may be deflected in the −Y-axis direction.

By use of this, as illustrated in (b) of FIG. 3, the wireless signal transmitted from the antenna array 142 may be deflected in the −X-axis direction and the −Y-axis direction. As illustrated in (c) of FIG. 3, the wireless signal transmitted from the antenna array 142 may be deflected in the −X-axial direction and the −Y-axis direction thereof. As illustrated in (d) of FIG. 3, the wireless signal transmitted from the antenna array 142 may be deflected in the +X-axis direction and the +Y-axis direction. As illustrated in (e) of FIG. 3, the wireless signal transmitted from the antenna array 142 may be deflected in the +X-axis direction and the −Y-axis direction.

As described above, the antenna array 142 may emit a wireless signal biased in a specific direction. Furthermore, by the same principle, the antenna may receive a wireless signal deflected in a specific direction.

The transceiver 141 may receive communication data from the controller 150 and provide an analog communication signal corresponding to the communication data to each of the antennae 142a included in the antenna array 142.

The transceiver 141 may receive information related to an emission direction of a wireless signal from the controller 150. The transceiver 141 may control a phase of the analog communication signal provided to each of the antennae 142a, depending on the emission direction.

For example, when the emission direction of the wireless signal is deflected in the −X direction, the transceiver 141 may control the phase of the analog communication signal so that the phase of the analog communication signal provided to the antenna located in the positive direction (+X direction) on the X-axis precedes the phase of the analog communication signal provided to the antenna located in the negative direction (−X direction).

When the emission direction of the wireless signal is deflected in the direction, the transceiver 141 may control the phase of the analog communication signal so that the phase of the analog communication signal provided to the antenna located in the negative direction (−X direction) on the X-axis precedes the phase of the analog communication signal provided to the antenna located in the positive direction (+X direction).

When the emission direction of the wireless signal is deflected in the −Y direction, the transceiver 141 may control the phase of the analog communication signal so that the phase of the analog communication signal provided to the antenna located in the positive direction (+Y direction) on the Y-axis precedes the phase of the analog communication signal provided to the antenna located in the negative direction (−Y direction).

When the emission direction of the wireless signal is deflected in the +Y direction, the transceiver 141 may control the phase of the analog communication signal so that the phase of the analog communication signal provided to the antenna located in the negative direction (−Y direction) on the Y-axis precedes the phase of the analog communication signal provided to the antenna located in the positive direction (+Y direction).

The controller 150 may be electrically connected to the GNSS receiver 110, the acceleration sensor 120, the angular velocity sensor 130, and the communication device 140. For example, the controller 150 may be connected to the GNSS receiver 110, the acceleration sensor 120, the angular velocity sensor 130, and the communication device 140 through a vehicle communication network or a hard wire.

The controller 150 may receive the information related to the location of the personal air mobility 10 from the GNSS receiver 110 and receive information related to the movement (linear movement, rotational movement, etc.) of the personal air mobility 10 from the acceleration sensor 120 and the angular velocity sensor 130.

The controller 150 may identify the latitude, longitude and/or altitude of the personal air mobility 10 based on the information related to the location of the personal air mobility 10. Furthermore, the controller 150 may identify the velocity, angular velocity, acceleration and/or angular acceleration of the personal air mobility 10 based on the information related to the movement (linear movement, rotational movement, etc.) of the personal air mobility 10.

The controller 150 may identify a direction of beamforming (an emission direction of a wireless signal) for efficiently communicating with external devices based on the latitude, longitude, and/or altitude of the personal air mobility 10. Furthermore, the controller 150 may provide the information related to the emission direction of the wireless signal to the communication device 140.

The controller 150 may predict a movement route of the personal air mobility 10 based on the latitude, longitude and/or altitude of the personal air mobility 10 and the velocity, angular velocity, acceleration and/or angular acceleration of the personal air mobility 10. The controller 150 may estimate the emission direction of the wireless signal for efficiently communicating with external devices based on the expected movement route of the personal air mobility 10. Furthermore, the controller 150 may provide the information related to the emission direction of the wireless signal expected for efficient communication to the communication device 140.

The controller 150 may include at least one processor 151 and at least one memory 152. The processor 151 and the memory 152 may be implemented as separate semiconductor devices or as one single semiconductor device.

The processor 151 may include one chip (or core) or a plurality of chips (or cores). For example, the processor 151 may include a graphic processor, a digital signal processor, and/or a micro control unit (MCU).

The processor 151 may process the information related to the location of the personal air mobility 10 and the information related to the movement of the personal air mobility 10. The processor 151 may determine the emission direction of the wireless signal based on the processing of the information related to the location of the personal air mobility 10 and the information related to the movement of the personal air mobility 10, and output the information related to the emission direction of the wireless signal to the communication device 140.

The memory 152 may include a volatile memory such as a static random access memory (S-RAM) and a dynamic random access memory (D-ROM), and a non-volatile memory such as a read only memory (ROM) and an erasable programmable read only memory (EPROM). The memory 152 may include one memory device or a plurality of memory devices.

The memory 152 may process the information related to the location of the personal air mobility 10 and the information related to the movement of the personal air mobility 10, and store or remember a program and data for determining the emission direction of the wireless signal.

Accordingly, the controller 150 may process the information related to the location of the personal air mobility 10 and the information related to the movement of the personal air mobility 10, and determine the emission direction of the wireless signal for efficient communication with external devices.

An operation of the personal air mobility which will be described below, may be due to an operation of the controller 150.

Figure 4:
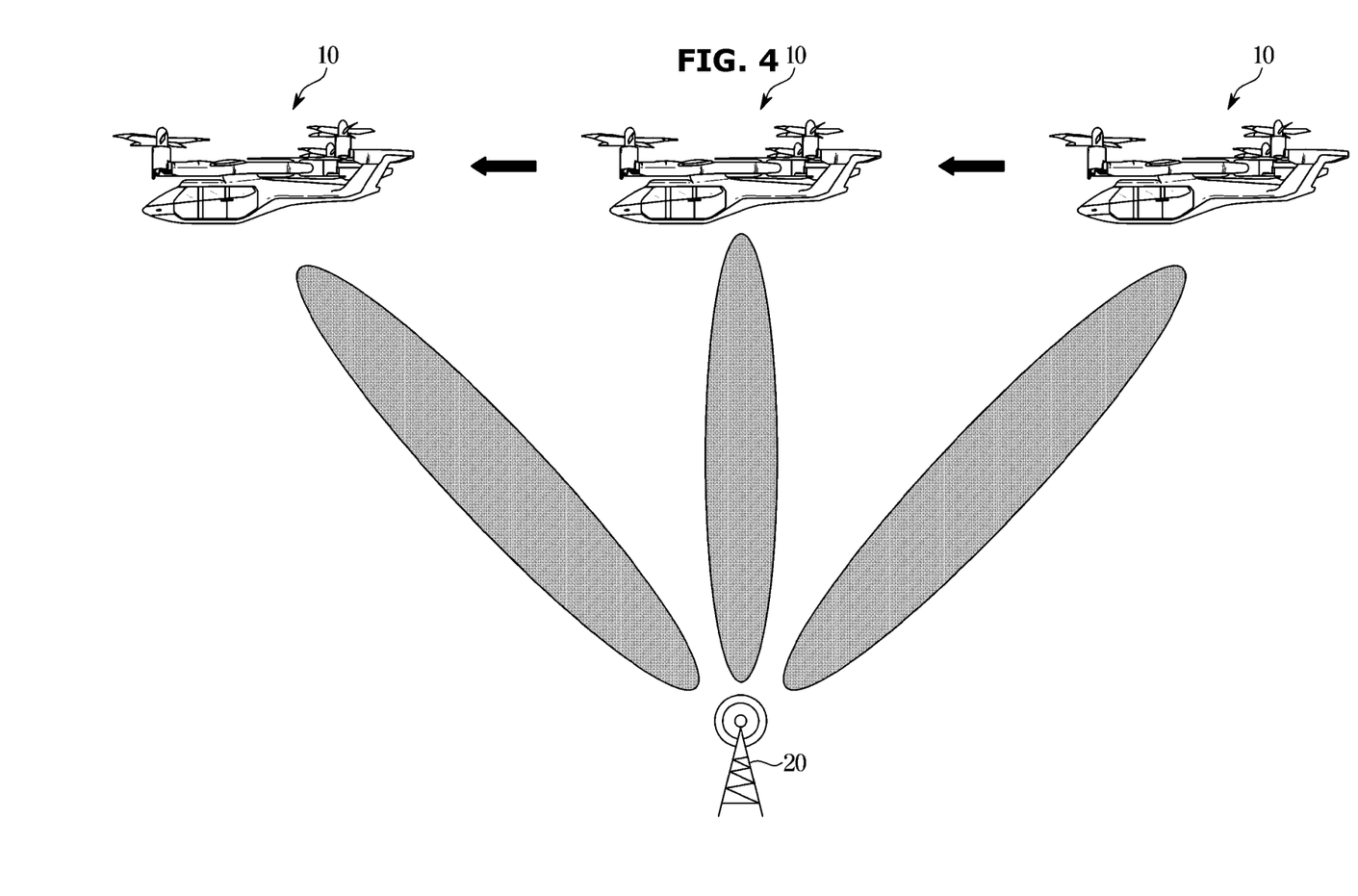
FIG. 4 illustrates an example in which the personal air mobility according to an exemplary embodiment communicates with a fixed communication target.

FIG. 4 illustrates an example in which the personal air mobility according to an exemplary embodiment communicates with a fixed communication target.

As illustrated in FIG. 4, the personal air mobility 10 may communicate with a first communication target 20 fixed to the ground during flight.

The controller 150 may identify the latitude, longitude and/or altitude of the personal air mobility 10 based on the GNSS signal received during flight.

The controller 150 may identify whether the personal air mobility 10 may communicate with the first communication target 20 based on the latitude, longitude, and/or altitude of the personal air mobility 10. For example, the controller 150 may store information related to a location of the first communication target 20 (including latitude, longitude, and/or altitude) in the memory 152 in advance. The controller 150 may identify a distance between the first communication target 20 and the personal air mobility 10 based on the location of the first communication target 20 and the location of the personal air mobility 10. The controller 150 may identify whether the personal air mobility 10 may communicate with the first communication target 20 based on a distance between the first communication target 20 and the personal air mobility 10.

The controller 150 may identify a relative location of the first communication target 20 with respect to the location of the personal air mobility 10 based on the location of the first communication target 20 and the location of the personal air mobility 10. In other words, the controller 150 may identify a direction of facing the first communication target 20.

The controller 150 may provide the information related to the emission direction of the wireless signal to the communication device 140 so that the wireless signal is deflected toward the direction of facing the first communication target 20.

As illustrated in FIG. 4, the personal air mobility 10 may move during flight. While the personal air mobility 10 is moving, the controller 150 may receive the velocity, angular velocity, acceleration and/or angular acceleration of the personal air mobility 10 based on the outputs of the acceleration sensor 120 and the angular velocity sensor 130. The controller 150 may predict a next (second time) latitude, longitude, altitude, velocity and/or angular velocity of the personal air mobility 10 based on a current (first time) latitude, longitude, altitude, velocity, angular velocity, acceleration and/or angular acceleration of the personal air mobility 10. In other words, the controller 150 may predict the location (latitude, longitude and/or altitude) of the personal air mobility 10 at the next instant (next sampling time).

The controller 150 may predict the relative location of the first communication target 20 with respect to the location of the personal air mobility 10 based on the predicted location (latitude, longitude and/or altitude) of the personal air mobility 10.

The controller 150 may provide the information related to the emission direction of the wireless signal to the communication device 140 so that the wireless signal is deflected toward the direction of facing the first communication target 20.

Furthermore, the controller 150 may correct the predicted location (latitude, longitude and/or altitude) of the personal air mobility 10 based on the GNSS signal. In other words, when the location of the personal air mobility 10 predicted based on the outputs of the acceleration sensor 120 and the angular velocity sensor 130 is different from the location of the personal air mobility 10 identified based on the GNSS signal, the controller 150 may correct the location of the personal air mobility 10 based on the location of the personal air mobility 10 identified based on the GNSS signal.

By the continuous operations described above, as illustrated in FIG. 4, the emission direction of the wireless signal by the beamforming of the personal air mobility 10 during the flight of the personal air mobility 10 may direct to the first communication target 20. Therefore, the personal air mobility 10 may communicate efficiently with the first communication target 20.

Figure 5:
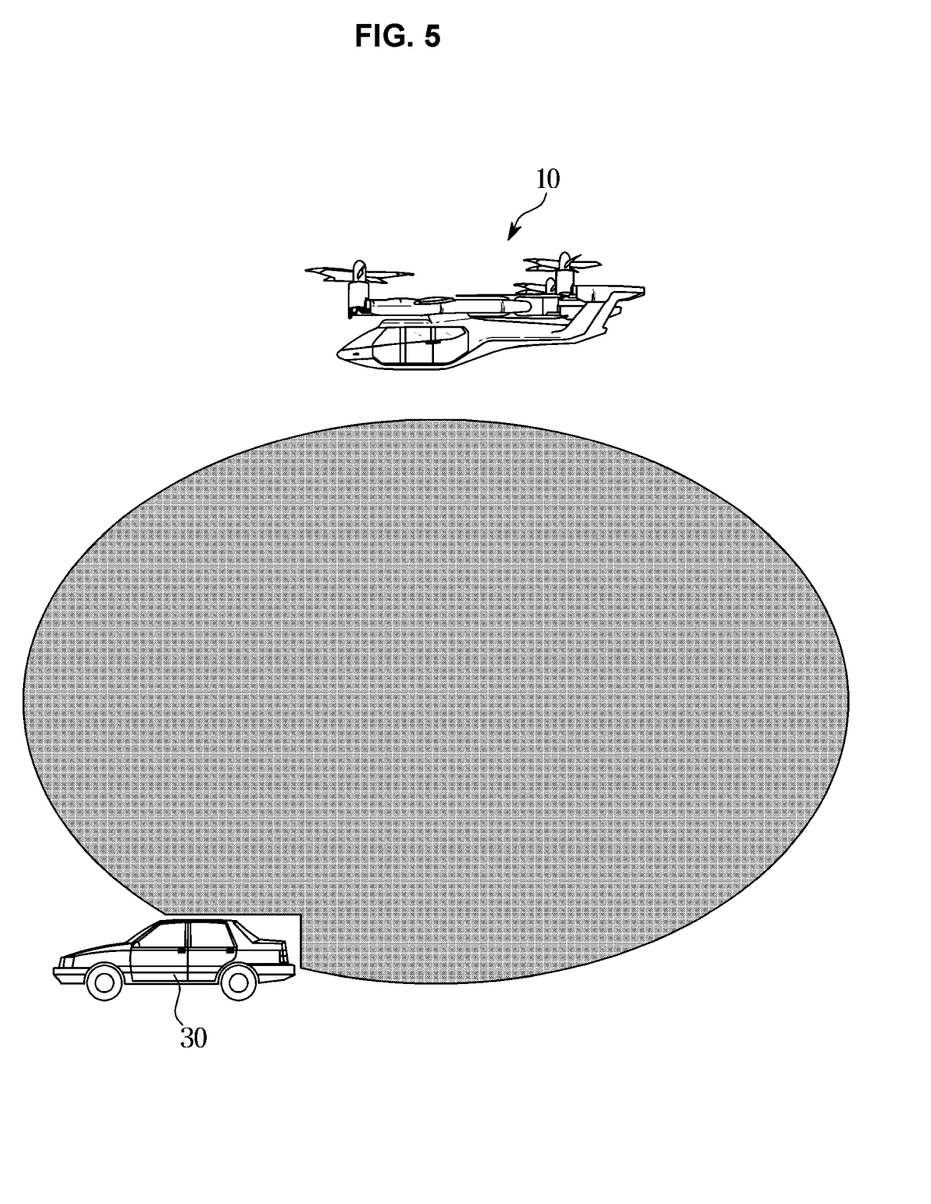
FIG. 5 and FIG. 6 illustrates an example in which the personal air mobility according to an exemplary embodiment communicates with a moving communication target.
Figure 6:
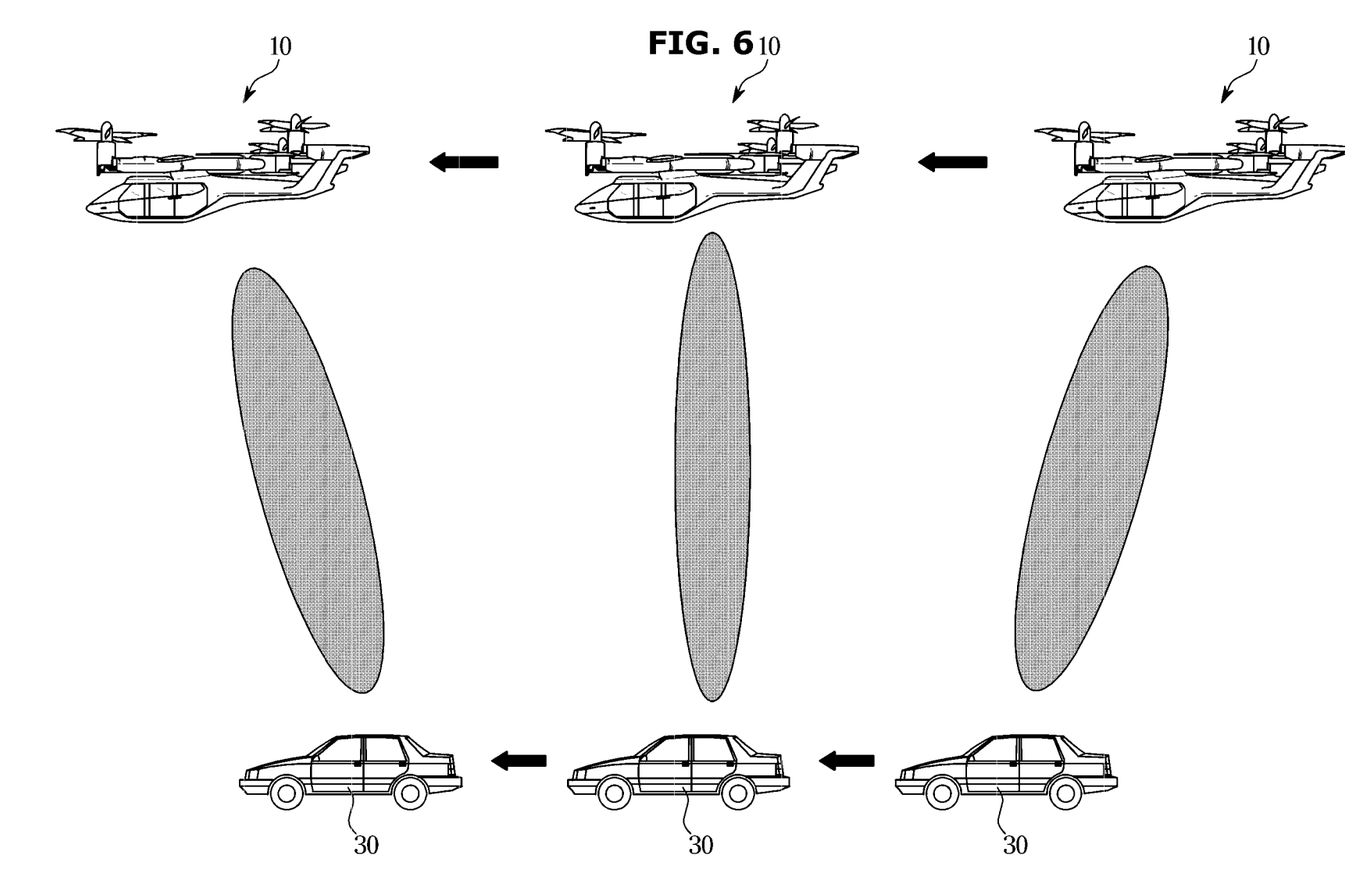

FIG. 5 and FIG. 6 illustrates an example in which the personal air mobility according to an exemplary embodiment communicates with a moving communication target.

As illustrated in FIG. 5 and FIG. 6, the personal air mobility 10 may communicate with a second communication target 30 (e.g., vehicle) moving on the ground during flight.

As illustrated in FIG. 5, the personal air mobility 10 may emit a wireless signal omni-directionally to communicate with the second communication target 30 whose location is unknown. For example, the controller 150 may provide a control signal to the communication device 140 so that the wireless signal emitted from the antenna does not have directionality.

The controller 150 may establish wireless communication with the second communication target 30 while emitting the wireless signal omni-directionally. Furthermore, the controller 150 may receive information related to a location and movement of the second communication target 30 from the second communication target 30. For example, the information related to the location and movement of the second communication target 30 may include a latitude, longitude, velocity, angular velocity, acceleration, and/or angular acceleration of the second communication target 30.

The controller 150 may identify the latitude, longitude, velocity, angular velocity, acceleration, and/or angular acceleration of the second communication target 30 based on the information related to the location and movement of the second communication target 30.

The controller 150 may identify a relative location of the second communication target 30 with respect to the location of the personal air mobility 10 based on the location of the second communication target 30 and the location of the personal air mobility 10. In other words, the controller 150 may identify a direction of facing the second communication target 30.

The controller 150 may provide information related to the emission direction of the wireless signal to the communication device 140 so that the wireless signal is deflected toward the direction of facing the second communication target 30.

As illustrated in FIG. 6, the personal air mobility 10 may move during flight, and the second communication target 30 may also move. The controller 150 may predict the next (second time) latitude, longitude, altitude, velocity and/or angular velocity of the personal air mobility 10 based on the current (first time) latitude, longitude, altitude, velocity, angular velocity, acceleration and/or angular acceleration of the personal air mobility 10. Furthermore, controller 150 may predict the next (second time) latitude, longitude, velocity and/or angular velocity of the second communication target 30 based on the current (first time) latitude, longitude, velocity, angular velocity, acceleration and/or angular acceleration of the second communication target 30.

The controller 150 may predict the relative location of the second communication target 30 with respect to the location of the personal air mobility 10 based on the predicted location of the personal air mobility 10 and the location of the second communication target 30.

The controller 150 may provide the information related to the emission direction of the wireless signal to the communication device 1410 so that the wireless signal is deflected toward the direction of facing the second communication target 30.

The controller 150 may correct the predicted location of the personal air mobility 10 based on the GNSS signal. Furthermore, the controller 150 may correct the predicted location of the second communication target 30 based on the location information received from the second communication target 30.

By the continuous operations described above, as illustrated in FIG. 6, the emission direction of the wireless signal by the beamforming of the personal air mobility 10 during the flight of the personal air mobility 10 may direct to the second communication target 30. Therefore, the personal air mobility 10 may communicate efficiently with the second communication target 30.

Figure 7:
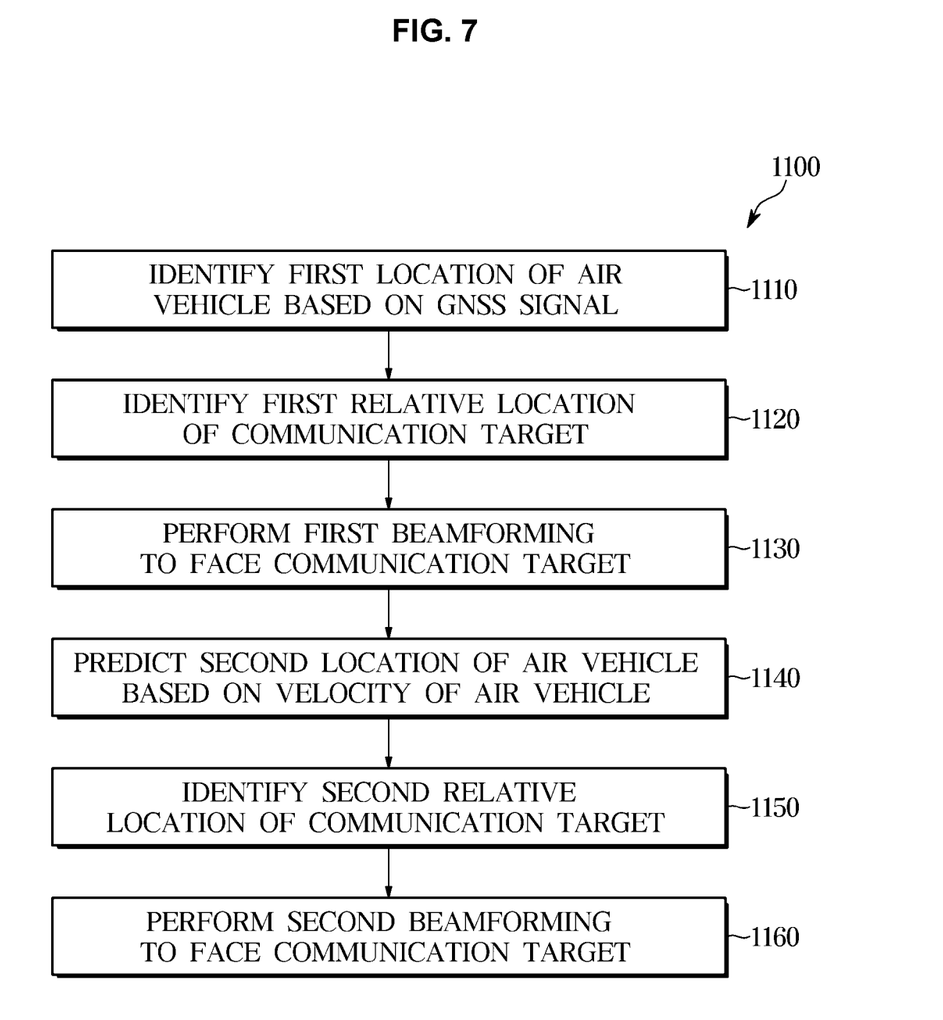
FIG. 7 illustrates a method in which the personal air mobility according to an exemplary embodiment communicates with the fixed communication target.

FIG. 7 illustrates a method in which the personal air mobility according to an exemplary embodiment communicates with the fixed communication target.

Hereinafter, a communication method 1100 of the personal air mobility 10 will be described with reference to FIG. 7.

The personal air mobility 10 may identify a first location of the personal air mobility 10 based on the GNSS signal (1110).

For example, the controller 150 may identify the latitude, longitude and/or altitude of the personal air mobility 10 based on the GNSS signal received during flight.

The personal air mobility 10 may identify a first relative location of the fixed communication target (1120).

For example, the controller 150 may store the information (including latitude, longitude, and/or altitude) about the location of the first communication target 20 in advance. The controller 150 may identify the relative location of the first communication target 20 with respect to the location of the personal air mobility 10 based on the location of the first communication target 20 and the location of the personal air mobility 10.

The personal air mobility 10 may perform a first beamforming to face the communication target (1130).

For example, the controller 150 may provide the information related to the emission direction of the wireless signal to the communication device 140 so that the wireless signal is deflected toward the direction of facing the first communication target 20.

The personal air mobility 10 may predict a second location of the personal air mobility 10 based on a moving velocity (1140).

While the personal air mobility 10 is moving, the controller 150 may predict the next (second time) latitude, longitude, altitude, velocity and/or angular velocity of the personal air mobility 10 based on the current (first time) latitude, longitude, altitude, velocity, angular velocity, acceleration and/or angular acceleration of the personal air mobility 10.

The personal air mobility 10 may identify a second relative location of the fixed communication target (1150).

For example, the controller 150 may predict the relative location of the first communication target 20 with respect to the location of the personal air mobility 10 based on the predicted location (latitude, longitude and/or altitude) of the personal air mobility 10.

The personal air mobility 10 may perform a second beamforming to face the communication target (1160).

As described above, the emission direction of the wireless signal by the beamforming of the personal air mobility 10 during the flight of the personal air mobility 10 may direct to the first communication target 20. Therefore, the personal air mobility 10 may communicate efficiently with the first communication target 20.

Figure 8:
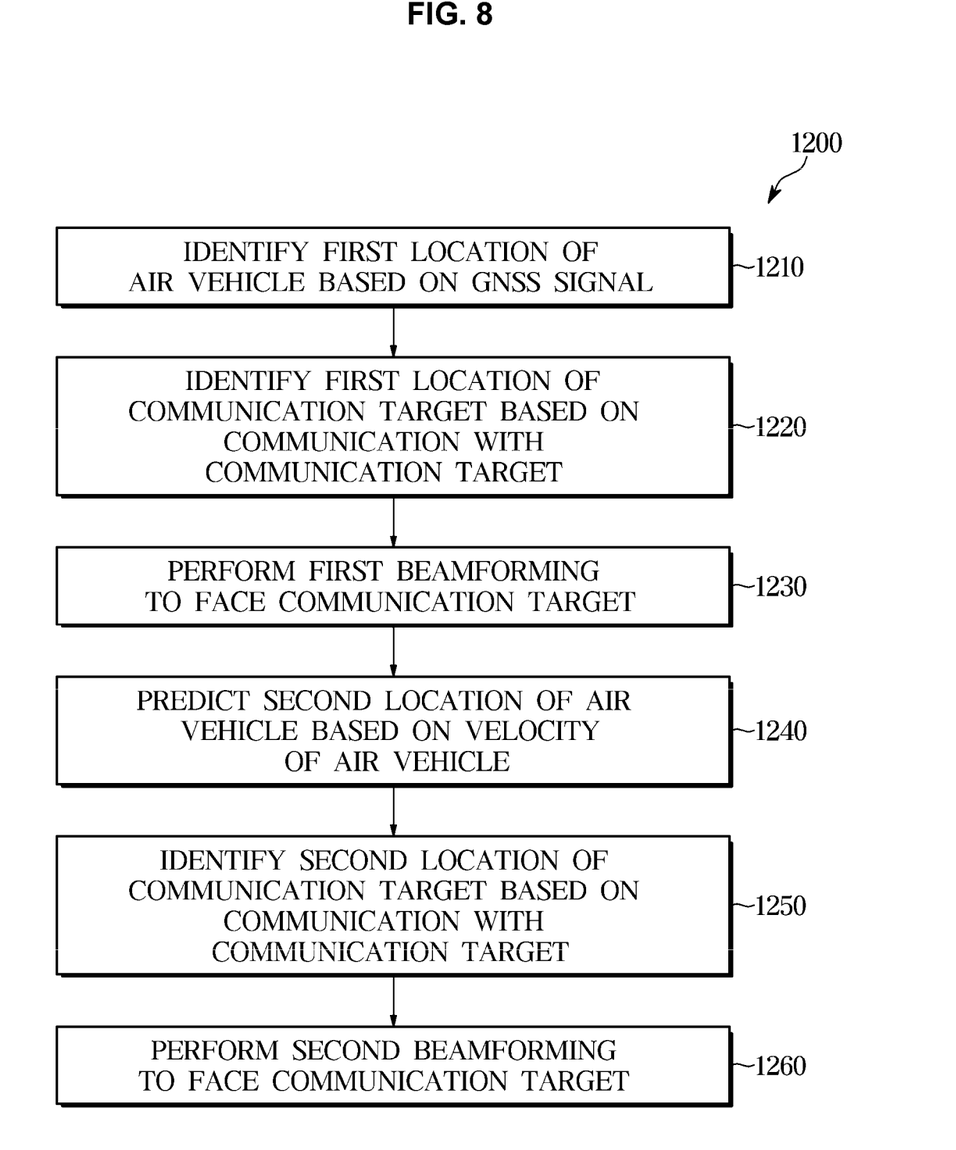
FIG. 8 illustrates a method in which the personal air mobility according to an exemplary embodiment communicates with the moving communication target.

FIG. 8 illustrates a method in which the personal air mobility according to an exemplary embodiment communicates with the moving communication target.

Hereinafter, a communication method 1200 of the personal air mobility 10 will be described with reference to FIG. 8.

The personal air mobility 10 may identify the first location of the personal air mobility 10 based on the GNSS signal (1210).

Operation 1210 may be the same as operation 1110 illustrated in FIG. 7.

The personal air mobility 10 may identify the first relative location of the communication target through communication with the moving communication target (1220).

For example, the controller 150 may establish wireless communication with the second communication target 30 while emitting the wireless signal omni-directionally. The controller 150 may receive the information related to the location and movement of the second communication target 30 from the second communication target 30.

The controller 150 may identify the relative location of the second communication target 30 with respect to the location of the personal air mobility 10 based on the location of the second communication target 30 and the location of the personal air mobility 10.

The personal air mobility 10 may perform the first beamforming to face the communication target (1230).

Operation 1230 may be the same as operation 1130 illustrated in FIG. 7.

The personal air mobility 10 may predict the second location of the personal air mobility 10 based on the moving velocity (1240).

Operation 1240 may be the same as operation 1140 illustrated in FIG. 7.

The personal air mobility 10 may identify the second relative location of the communication target through communication with the moving communication target (1250).

For example, the controller 150 may predict the next (second time) latitude, longitude, altitude, velocity and/or angular velocity of the personal air mobility 10 based on the current (first time) latitude, longitude, altitude, velocity, angular velocity, acceleration and/or angular acceleration of the personal air mobility 10. Furthermore, controller 150 may predict the next (second time) latitude, longitude, velocity and/or angular velocity of the second communication target 30 based on the current (first time) latitude, longitude, velocity, angular velocity, acceleration and/or angular acceleration of the second communication target 30.

The controller 150 may predict the relative location of the second communication target 30 with respect to the location of the personal air mobility 10 based on the predicted location of the personal air mobility 10 and the location of the second communication target 30.

The personal air mobility 10 may perform the second beamforming to face the communication target (1260).

As described above, the emission direction of the wireless signal by the beamforming of the personal air mobility 10 during the flight of the personal air mobility 10 may direct to the second communication target 30. Therefore, the personal air mobility 10 may communicate efficiently with the second communication target 30.

As is apparent from the above, according to an aspect of the present disclosure, an air mobility configured for efficiently communicating with a communication target on the ground, and a control method thereof may be provided.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air mobility comprising:
    a global navigation satellite system (GNSS) receiver;
    an antenna array; and
    a controller electrically coupled to the GNSS receiver and the antenna array,
    wherein the controller is configured to
        identify a first location of the air mobility including an altitude of the air mobility based on an output of the GNSS receiver,
        identify a first relative direction of facing a communication target with respect to the first location of the air mobility,
        control the antenna array so that a wireless signal emitted by the antenna array is deflected in the first relative direction,
        predict a second relative direction of facing the communication target based on a movement of the air mobility, and
        control the antenna array so that the wireless signal emitted by the antenna array is deflected in the second relative direction,
    wherein the controller is configured to receive a location of a moving communication target from the moving communication target while controlling the antenna array to emit the wireless signal omni-directionally, and
    wherein the controller is configured to identify the first relative direction based on the received location of the moving communication target and a location of the air mobility.

2. The air mobility of claim 1, wherein the controller is configured to:
    store a location of the communication target in advance, and
    identify the first relative direction based on the stored location of the communication target and the location of the air mobility.

3. The air mobility of claim 2, further including:
    an acceleration sensor and an angular velocity sensor, wherein the controller is configured to:
        identify a moving velocity and a moving direction of the air mobility based on an output of the acceleration sensor and an output of the angular velocity sensor, and
        predict a second location of the air mobility based on the moving velocity and the moving direction of the air mobility.

4. The air mobility of claim 3, wherein the controller is configured to correct the second location of the air mobility based on an output of the GNSS receiver.

5. The air mobility of claim 1, further including:
    an acceleration sensor and an angular velocity sensor electrically connected to the controller,
    wherein the controller is configured to:
        identify a moving velocity and a moving direction of the air mobility based on an output of the acceleration sensor and an output of the angular velocity sensor, and
        predict a second location of the air mobility based on the moving velocity and the moving direction of the air mobility.

6. The air mobility of claim 5, wherein the controller is configured to:
    identify a moving velocity and a moving direction of the moving communication target based on communication with the moving communication target, and
    predict the location of the communication target based on the moving velocity and the moving direction of the communication target.

7. The air mobility of claim 6, wherein the controller is configured to:
    correct a second location of the air mobility based on an output of the GNSS receiver, and
    correct the location of the moving communication target based on the communication with the moving communication target.

8. The air mobility of claim 1,
    wherein the antenna array includes a plurality of antennae, and
    wherein the controller is configured to provide wireless signals including different phase delays to the plurality of antennae so that the wireless signals by the antenna array are deflected.

9. A method of controlling an air mobility, which includes a global navigation satellite system (GNSS) receiver and an antenna array, the mothed comprising:
    identifying, by a controller, a first location of the air mobility including an altitude of the air mobility based on an output of the GNSS receiver;
    identifying, by the controller, a first relative direction of facing a communication target with respect to the first location of the air mobility;
    deflecting a wireless signal emitted by the antenna array in the first relative direction thereof;
    predicting, by the controller, a second relative direction of facing the communication target based on a movement of the air mobility; and
    deflecting the wireless signal emitted by the antenna array in the second relative direction thereof,
    wherein the deflecting of the wireless signal in the first relative direction further includes receiving, by the controller, a location of a moving communication target from the moving communication target while controlling the antenna array to emit the wireless signal omni-directionally, and identifying, by the controller, the first relative direction based on the received location of the moving communication target and a location of the air mobility.

10. The method of claim 9, wherein the deflecting of the wireless signal in the first relative direction includes:
   storing a location of the communication target in advance, and
   identifying, by the controller, the first relative direction based on the stored location of the communication target and a location of the air mobility.

11. The method of claim 10, wherein the deflecting of the wireless signal in the second relative direction includes:
   identifying, by the controller, a moving velocity and a moving direction of the air mobility based on an output of an acceleration sensor and an output of an angular velocity sensor of the air mobility, and
   predicting, by the controller, a second location of the air mobility based on the moving velocity and the moving direction of the air mobility.

12. The method of claim 11, further including correcting the second location of the air mobility based on an output of the GNSS receiver.

13. The method of claim 9, wherein the deflecting of the wireless signal in the second relative direction includes:
   identifying, by the controller, a moving velocity and a moving direction of the air mobility based on an output of an acceleration sensor and an output of an angular velocity sensor of the air mobility, wherein the acceleration sensor and the angular velocity sensor are electrically connected to the controller, and
   predicting, by the controller, a second location of the air mobility based on the moving velocity and the moving direction of the air mobility.

14. The method of claim 13, wherein the deflecting of the wireless signal in the second relative direction further includes:
   identifying, by the controller, a moving velocity and a moving direction of the moving communication target based on communication with the moving communication target, and
   predicting, by the controller, the location of the communication target based on the moving velocity and the moving direction of the communication target.

15. The method of claim 14, further including:
   correcting, by the controller, a second location of the air mobility based on an output of the GNSS receiver; and
   correcting, by the controller, the location of the moving communication target based on the communication with the moving communication target.

16. The method of claim 9, further including:
   providing, by the controller, wireless signals including different phase delays to a plurality of antennae of the antenna array so that the wireless signals by the antenna array are deflected.

* * * * *